(12) United States Patent
Sakai et al.

(10) Patent No.: US 7,174,509 B2
(45) Date of Patent: Feb. 6, 2007

(54) MULTIMODAL DOCUMENT RECEPTION APPARATUS AND MULTIMODAL DOCUMENT TRANSMISSION APPARATUS, MULTIMODAL DOCUMENT TRANSMISSION/RECEPTION SYSTEM, THEIR CONTROL METHOD, AND PROGRAM

(75) Inventors: Keiichi Sakai, Kanagawa (JP); Tetsuo Kosaka, Yamagata (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 10/291,722

(22) Filed: Nov. 12, 2002

(65) Prior Publication Data

US 2003/0097265 A1 May 22, 2003

(30) Foreign Application Priority Data

Nov. 21, 2001 (JP) .............................. 2001-356487

(51) Int. Cl.
*G06F 15/00* (2006.01)
*G06F 17/00* (2006.01)

(52) U.S. Cl. .................... 715/526; 715/500.1; 715/542; 704/246

(58) Field of Classification Search ................ 715/514, 715/526, 500.1, 542; 704/246; 345/700
See application file for complete search history.

(56) References Cited

U.S. PATENT DOCUMENTS 7,062,437 B2 * 6/2006 Kovales et al. ............. 704/260

2003/0071833 A1 * 4/2003 Dantzig et al. ............. 345/700
2004/0225968 A1 * 11/2004 Look et al. ................. 715/778

FOREIGN PATENT DOCUMENTS

| JP | 10-326244 | 12/1998 |
|---|---|---|
| JP | 11-250009 | 9/1999 |

OTHER PUBLICATIONS

Niklfeld, Georg et al., Component-based multimodal dialog interfaces for mobile knowledge creation, Jul. 2001, ACM Proceedings of the workshop on Human Language Technology and Knowledge Management—vol. 2001, pp. 1-8.*

* cited by examiner

*Primary Examiner*—William Bashore
(74) *Attorney, Agent, or Firm*—Fitzpatrick, Cella, Harper & Scinto

(57) ABSTRACT

Modality information indicating various functions of a multimodal document reception processing apparatus is transmitted to a multimodal document transmission apparatus, and a multimodal document, which is generated by the multimodal document transmission apparatus based on the modality information is received. A speech synthesis unit synthesizes speech of text data to be output as speech in the multimodal document, and a speech output unit outputs the synthesized output speech. A GUT display unit displays text data to be displayed in the multimodal document.

17 Claims, 37 Drawing Sheets

FIG. 6

```
<html lang="ja">
<head>
    <title>○×NEWS   LOCAL NEWS PAGE</title></head>
<body>
    <h1>MIDTOWN CHERRY BLOSSOMS IN FULL BLOOM</h1>
        <h2>APRIL 3, IT BECAME AS WARM AS AT THE BEGINNING OF MAY
        IN KANTO AREA, AND CHERRY BLOSSOMS ARE IN FULL BLOOM.</h2>
    <!--   <voice>APRIL 3, IT BECAME AS WARM AS AT THE BEGINNING OF MAY IN
            KANTO AREA, AND CHERRY BLOSSOMS ARE IN FULL BLOOM.
            APRIL 3, WARM SOUTH WIND BLEW IN KANTO AREA, AND TEMPERATURE
            EXCEEDED 20°C AND IT BECAME AS WARM AS AT THE BEGINNING OF MAY.
            CHERRY BLOSSOMS IN TOKYO ARE IN FULL BLOOM, AND UENO PARK IS
            PACKED WITH FAMILIES IN SPRING HOLIDAYS AND BUSINESS PERSONS
            WHO STAKE OUT SPOTS.
        </voice>   -->
    <h1>ELDERLY WOMAN WHO LIVED ALONE, DIED OF FIRE</h1>
        <h2>APRIL 3, PREDAWN FIRE OCCURRED IN △△-KU, TOKYO,
        AND ELDERLY WOMAN WHO LIVED ALONE WAS FOUND DEAD.</h2>
    <!--   <voice>APRIL 3, PREDAWN FIRE OCCURRED IN △△-KU, TOKYO,
            AND ELDERLY WOMAN WHO LIVED ALONE WAS FOUND DEAD.
            APRIL 3, 5 AM, PASSERBY FOUND SMOKE FROM 6TH FLOOR OF
            APARTMENT IN 3-CHOME, △△-KU, TOKYO, AND REPORTED TO △△
            POLICE OFFICE. △△ POLICE OFFICERS FOUND UNEMPLOYED MRS.
            ■○▲☆ DOWN AND DEAD IN HER KITCHEN. MRS. ■○ LIVED ALONE.
        </voice>   -->
</body>
</html>
```

FIG. 7

○×NEWS   LOCAL NEWS PAGE

MIDTOWN CHERRY BLOSSOMS IN FULL BLOOM
APRIL 3, IT BECAME AS WARM AS AT THE BEGINNING
OF MAY IN KANTO AREA, AND CHERRY BLOSSOMS
ARE IN FULL BLOOM.

ELDERLY WOMAN WHO LIVED ALONE, DIED OF FIRE
APRIL 3, PREDAWN FIRE OCCURRED IN △△-KU,
TOKYO, AND ELDERLY WOMAN WHO LIVED ALONE
WAS FOUND DEAD.

FIG. 8

```xml
<?xml version="1.0" encoding="Shift_JIS"?>
<xmlDocument>
   <pageTitle>○×NEWS   LOCAL NEWS PAGE</pageTitle>
   <contents>
      <article><aID>1</aID><aTitle>MIDTOWN CHERRY BLOSSOMS IN FULL BLOOM</aTitle>
      <abstract>APRIL 3, IT BECAME AS WARM AS AT THE BEGINNING OF MAY IN KANTO AREA, AND CHERRY BLOSSOMS ARE IN FULL BLOOM.</abstract>
      <details>APRIL 3, WARM SOUTH WIND BLEW IN KANTO AREA,
      AND TEMPERATURE EXCEEDED 20°C AND IT BECAME AS WARM AS AT THE BEGINNING OF MAY. CHERRY BLOSSOMS IN TOKYO ARE IN FULL BLOOM, AND UENO PARK IS PACKED WITH FAMILIES IN SPRING HOLIDAYS AND BUSINESS PERSONS WHO STAKE OUT SPOTS.
      </details></abstract>
      <article><aID>2</aID><aTitle>ELDERLY WOMAN WHO LIVED ALONE, DIED OF FIRE</aTitle>
      <abstract>APRIL 3, PREDAWN FIRE OCCURRED IN △△-KU, TOKYO, AND ELDERLY WOMAN WHO LIVED ALONE WAS FOUND DEAD.</abstract>
      <details>APRIL 3, 5 AM, PASSERBY FOUND SMOKE FROM 6TH FLOOR OF APARTMENT IN 3-CHOME, △△-KU, TOKYO, AND REPORTED TO △△ POLICE OFFICE. △△ POLICE OFFICERS FOUND UNEMPLOYED MRS. ■○▲☆ DOWN AND DEAD IN HER KITCHEN. MRS. ■○ LIVED ALONE.
      </details></abstract>
   </contents>
</xmlDocument>
```

FIG. 9

```xml
<?xml version="1.0" encoding="Shift_JIS"?>
<xsl:stylesheet xmlns:xsl="http://www.w3.org/TR/WD-xsl" xml:lang="ja">
<xsl:template match="/">
   <html lang="ja">
   <head>
       <title><xsl:value-of select="xmlDocument/pageTitle"/></title>
   </head>
   <body>
       <div><xsl:apply-templates select="xmlDocument/contents"/>
       </div>
   </body>
   </html>
</xsl:template>

<xsl:template match="xmlDocument/contents">
   <xsl:for-each select="article">
       <h1><xsl:value-of select="aTitle"/></h1>
       <h2><xsl:value-of select="abstract"/></h2>
       <!--
           <voice><xsl:value-of select="abstract"/></voice>
           <voice><xsl:value-of select="details"/></voice>
       -->
   </xsl:for-each>
</xsl:template>
</xsl:stylesheet>
```

FIG. 10

```
<HTML lang="ja">
<HEAD>
<TITLE>○×NEWS   LOCAL NEWS PAGE</TITLE>
<SCRIPT TYPE="text/javascript" LANGUAGE="javascript" SRC="spec_0.js"></SCRIPT>
</HEAD>
<BODY>
<FORM METHOD="POST" name="Society">
<P/>
<H2>MIDTOWN CHERRY BLOSSOMS IN FULL BLOOM</H2>
<h3>APRIL 3, IT BECAME AS WARM AS AT THE BEGINNING OF MAY
IN KANTO AREA, AND CHERRY BLOSSOMS ARE IN FULL BLOOM.
<select onChange="ViewChange_Menu(this)" name="Detail1" CLASS="C_Detail1">
<option value="0" selected="Yes">SUMMARY</option>
<option value="1">DETAILS</option>
</select></h3>
    <SPAN ID="C_Detail1" CLASS="0" STYLE="display=none">
        APRIL 3, WARM SOUTH WIND BLEW IN KANTO AREA, AND TEMPERATURE
        EXCEEDED 20°C AND IT BECAME AS WARM AS AT THE BEGINNING OF MAY.
        CHERRY BLOSSOMS IN TOKYO ARE IN FULL BLOOM, AND UENO PARK IS
        PACKED WITH FAMILIES IN SPRING HOLIDAYS AND BUSINESS PERSONS
        WHO STAKE OUT SPOTS.
    </SPAN>
<H2>ELDERLY WOMAN WHO LIVED ALONE, DIED OF FIRE</H2>
<h3>APRIL 3, PREDAWN FIRE OCCURRED IN △△-KU, TOKYO, AND ELDERLY
WOMAN WHO LIVED ALONE WAS FOUND DEAD.
<select onChange="ViewChange_Menu(this)" name="Detail2" CLASS="C_Detail2">
<option value="0" selected="Yes">SUMMARY</option>
<option value="1">DETAILS</option>
</select></h3>
    <SPAN ID="C_Detail2" CLASS="0" STYLE="display=none">
        APRIL 3, 5 AM, PASSERBY FOUND SMOKE FROM 6TH FLOOR OF
        APARTMENT IN 3-CHOME, △△-KU, TOKYO, AND REPORTED TO △△
        POLICE OFFICE. △△ POLICE OFFICERS FOUND UNEMPLOYED MRS.
        ■○▲☆ DOWN AND DEAD IN HER KITCHEN. MRS. ■○ LIVED ALONE.
    </SPAN>
<a href="index.htm">RETURN</a>
</FORM>
</BODY>
</HTML>
```

FIG. 11

```
function ViewChange_Menu(MenuElm)
{
   var TgtElmClct;
   var CldStyle;
   TgtElmClct=document.all(MenuElm.className);

if(MenuElm.value==0){
      CldStyle="none";
   }else{
      CldStyle="block";
   } if(TgtElmClct){
      if(TgtElmClct.length){
         for(i=0;i<TgtElmClct.length;i++){
            if(MenuElm.value==TgtElmClct[i].className){
               CldStyle="none";
            }else{
               CldStyle="block";
            }
            TgtElmClct[i].style.display=CldStyle;
         }
      }else{
         if(MenuElm.value==TgtElmClct.className){
            CldStyle="none";
         }else{
            CldStyle="block";
         }
         TgtElmClct.style.display=CldStyle;
      }
   }
}
```

FIG. 12
○×NEWS  LOCAL NEWS PAGE
MIDTOWN CHERRY BLOSSOMS IN FULL BLOOM
APRIL 3, IT BECAME AS WARM AS AT THE BEGINNING OF MAY IN KANTO AREA, AND CHERRY BLOSSOMS ARE IN FULL BLOOM.
SUMMARY 
ELDERLY WOMAN WHO LIVED ALONE, DIED OF FIRE
APRIL 3, PREDAWN FIRE OCCURRED IN △△-KU, TOKYO, AND ELDERLY WOMAN WHO LIVED ALONE WAS FOUND DEAD.
SUMMARY 

FIG. 13

○×NEWS   LOCAL NEWS PAGE

MIDTOWN CHERRY BLOSSOMS IN FULL BLOOM
APRIL 3, IT BECAME AS WARM AS AT THE BEGINNING OF MAY IN KANTO AREA, AND CHERRY BLOSSOMS ARE IN FULL BLOOM.

| SUMMARY |  |

APRIL 3, WARM SOUTH WIND BLEW IN KANTO AREA, AND TEMPERATURE EXCEEDED 20°C AND IT BECAME AS WARM AS AT THE BEGINNING OF MAY. CHERRY BLOSSOMS IN TOKYO ARE IN FULL BLOOM, AND UENO PARK IS PACKED WITH FAMILIES IN SPRING HOLIDAYS AND BUSINESS PERSONS WHO STAKE OUT SPOTS.

ELDERLY WOMAN WHO LIVED ALONE, DIED OF FIRE
APRIL 3, PREDAWN FIRE OCCURRED IN △△-KU, TOKYO, AND ELDERLY WOMAN WHO LIVED ALONE WAS FOUND DEAD.

| SUMMARY |  |

FIG. 14

```
<HTML>
<HEAD>
<TITLE>O×NEWS   LOCAL NEWS PAGE</TITLE>
<SCRIPT TYPE="text/javascript" LANGUAGE="javascript" SRC="spec_0.js"></SCRIPT>
</HEAD>
<BODY>
<FORM METHOD="POST" name="Society"><P/>
<H2>MIDTOWN CHERRY BLOSSOMS IN FULL BLOOM
<select onChange="ViewChange_Menu(this)" name="Article1" CLASS="C_Article1">
<option value="0" selected="Yes">HEADLINE</option>
<option value="1">SUMMARY</option></select></H2>
<SPAN ID="C_Article1" CLASS="0" STYLE="display=none">
<h3>APRIL 3, IT BECAME AS WARM AS AT THE BEGINNING OF MAY
IN KANTO AREA, AND CHERRY BLOSSOMS ARE IN FULL BLOOM.
<select onChange="ViewChange_Menu(this)" name="Detail1" CLASS="C_Detail1">
<option value="0" selected="Yes">SUMMARY</option>
<option value="1">DETAILS</option></select></h3>
    <SPAN ID="C_Detail1" CLASS="0" STYLE="display=none">
        APRIL 3, WARM SOUTH WIND BLEW IN KANTO AREA, AND TEMPERATURE
        EXCEEDED 20°C AND IT BECAME AS WARM AS AT THE BEGINNING OF MAY.
        CHERRY BLOSSOMS IN TOKYO ARE IN FULL BLOOM, AND UENO PARK IS
        PACKED WITH FAMILIES IN SPRING HOLIDAYS AND BUSINESS PERSONS
        WHO STAKE OUT SPOTS.
    </SPAN></SPAN>
<H2>ELDERLY WOMAN WHO LIVED ALONE, DIED OF FIRE
<select onChange="ViewChange_Menu(this)" name="Article2" CLASS="C_Article2">
<option value="0" selected="Yes">HEADLINE</option>
<option value="1">SUMMARY</option></select></H2>
<SPAN ID="C_Article2" CLASS="0" STYLE="display=none">
<h3>APRIL 3, PREDAWN FIRE OCCURRED IN △△-KU, TOKYO, AND ELDERLY
WOMAN WHO LIVED ALONE WAS FOUND DEAD.
<select onChange="ViewChange_Menu(this)" name="Detail2" CLASS="C_Detail2">
<option value="0" selected="Yes">SUMMARY</option>
<option value="1">DETAILS</option></select></h3>
    <SPAN ID="C_Detail2" CLASS="0" STYLE="display=none">
        APRIL 3, 5 AM, PASSERBY FOUND SMOKE FROM 6TH FLOOR OF
        APARTMENT IN 3-CHOME, △△-KU, TOKYO, AND REPORTED TO △△
        POLICE OFFICE. △△ POLICE OFFICERS FOUND UNEMPLOYED MRS.
        ■○▲☆ DOWN AND DEAD IN HER KITCHEN. MRS. ■○ LIVED ALONE.
    </SPAN></SPAN><a href="index.htm">RETURN</a>
</FORM>
</BODY>
</HTML>
```

FIG. 15
○✕NEWS   LOCAL NEWS PAGE
MIDTOWN CHERRY BLOSSOMS IN FULL BLOOM
HEADLINE 
ELDERLY WOMAN WHO LIVED ALONE, DIED OF FIRE
HEADLINE 

FIG. 16
○×NEWS  LOCAL NEWS PAGE
MIDTOWN CHERRY BLOSSOMS IN FULL BLOOM
| SUMMARY |  |
APRIL 3, IT BECAME AS WARM AS AT THE BEGINNING OF MAY IN KANTO AREA, AND CHERRY BLOSSOMS ARE IN FULL BLOOM.
| SUMMARY |  |
ELDERLY WOMAN WHO LIVED ALONE, DIED OF FIRE
| HEADLINE |  |

FIG. 17

○×NEWS　LOCAL NEWS PAGE

MIDTOWN CHERRY BLOSSOMS IN FULL BLOOM

SUMMARY 

APRIL 3, IT BECAME AS WARM AS AT THE BEGINNING OF MAY IN KANTO AREA, AND CHERRY BLOSSOMS ARE IN FULL BLOOM.

DETAILS 

APRIL 3, WARM SOUTH WIND BLEW IN KANTO AREA, AND TEMPERATURE EXCEEDED 20°C AND IT BECAME AS WARM AS AT THE BEGINNING OF MAY. CHERRY BLOSSOMS IN TOKYO ARE IN FULL BLOOM, AND UENO PARK IS PACKED WITH FAMILIES IN SPRING HOLIDAYS AND BUSINESS PERSONSWHO STAKE OUT SPOTS.

ELDERLY WOMAN WHO LIVED ALONE, DIED OF FIRE

HEADLINE 

FIG. 18

○×NEWS　FRONT PAGE

1. SOCIETY
2. POLITICS
3. ECONOMICS
4. INTERNATIONAL
5. SPORTS
6. ENTERTAINMENT
7. WEATHER FORECAST

○×NEWS  FRONT PAGE

1. SOCIETY
2. POLITICS
3. ECONOMICS
4. INTERNATIONAL
5. SPORTS
6. ENTERTAINMENT
7. WEATHER FORECAST

FIG. 24

```
<?xml version="1.0" encoding="Shift_JIS"?>
<xmlDocument>
    <device_in_modalities>
        <microphone>yes</microphone>                          ······2411
        <character_input>10keys</character_input>             ······2412
        <pointing>button</pointing>                           ······2413
        <focus_move>4way_button</focus_move>                  ······2414
        <hscroll>no</hscroll>                                 ······2415
        <vscroll>2way_button</vscroll>                        ······2416
    </device_in_modalities>
    <device_out_modalities>
        <speaker>yes</speaker>                                ······2421
        <earphone>yes</earphone>                              ······2422
        <screentype>bitmap</screentype>                       ······2423
        <screensize>100*120</screensize>                      ······2424
        <screencolor>RGB*16</screencolor>                     ······2425
    </device_out_modalities>
</xmlDocument>
```

2410 groups 2411–2416; 2420 groups 2421–2425.

FIG. 25

```xml
<?xml version="1.0" encoding="Shift_JIS"?>
<xmlDocument>
    <device_in_modalities>
        <microphone>yes</microphone>
        <character_input>2way_button</character_input>
        <pointing>button</pointing>
        <focus_move>2way_button</focus_move>
        <hscroll>no</hscroll>
        <vscroll>2way_button</vscroll>
    </device_in_modalities>
    <device_out_modalities>
        <speaker>yes</speaker>
        <earphone>yes</earphone>
        <screentype>character</screentype>
        <screensize>12*3</screensize>
        <screencolor>mono*2</screencolor>
    </device_out_modalities>
</xmlDocument>
```

FIG. 26

```xml
<?xml version="1.0" encoding="Shift_JIS"?>
<xmlDocument>
    <device_in_modalities>
        <microphone>yes</microphone>
        <character_input>software_keyboard</character_input>
        <pointing>stylus</pointing>
        <focus_move>stylus</focus_move>
        <hscroll>2way_button</hscroll>
        <vscroll>2way_button</vscroll>
    </device_in_modalities>
    <device_out_devices>
        <speaker>yes</speaker>
        <earphone>yes</earphone>
        <screentype>bitmap</screentype>
        <screensize>360 * 400</screensize>
        <screencolor>RGB * 16</screencolor>
    </device_out_modalities>
</xmlDocument>
```

FIG. 27

```
<?xml version="1.0" encoding="Shift_JIS"?>
<xmlDocument>
    <user_in_modalities>
        <microphone>on</microphone>                              ······2711
        <character_input>voice</character_input>                 ······2712
   2710 <pointing>voice,stylus</pointing>                        ······2713
        <focus_move>4way_button</focus_move>                     ······2714
        <vscroll>2way_button</vscroll>                           ······2715
    </user_in_modalities>
    <user_out_devices>
        <speaker>on</speaker>                                    ······2721
        <earphone>off</earphone>                                 ······2722
   2720 <large_character>screen</large_character>                ······2723
        <mid_character>screen,voice</mid_character>              ······2724
        <small_character>voice</small_character>                 ······2725
    </user_out_modalities>
</xmlDocument>
```

FIG. 28

```xml
<?xml version="1.0" encoding="Shift_JIS"?>
<xmlDocument>
    <user_in_modalities>
        <microphone>no</microphone>
        <character_input>voice</character_input>
        <pointing>voice</pointing>
        <focus_move>voice</focus_move>
        <vscroll>voice</vscroll>
    </user_in_modalities>
    <user_out_devices>
        <speaker>on</speaker>
        <earphone>off</earphone>
        <large_character>voice</large_character>
        <mid_character>voice</mid_character>
        <small_character>voice</small_character>
    </user_out_modalities>
</xmlDocument>
```

FIG. 29

```xml
<?xml version="1.0" encoding="Shift_JIS"?>
<xmlDocument>
  <pageTitle>○×NEWS  LOCAL NEWS PAGE</pageTitle>
  <contents>
    <article><aTitle>MIDTOWN CHERRY BLOSSOMS IN FULL BLOOM</aTitle>
    <abstract>APRIL 3, IT BECAME AS WARM AS AT THE BEGINNING OF MAY
IN KANTO AREA, AND CHERRY BLOSSOMS ARE IN FULL BLOOM.
    </abstract>
    <details>APRIL 3, WARM SOUTH WIND BLEW IN KANTO AREA, AND
TEMPERATURE EXCEEDED 20°C AND IT BECAME AS WARM AS AT
THE BEGINNING OF MAY. CHERRY BLOSSOMS IN TOKYO ARE IN FULL
BLOOM, AND UENO PARK IS PACKED WITH FAMILIES IN SPRING HOLIDAYS
AND BUSINESS PERSONS WHO STAKE OUT SPOTS.
    </details></abstract>
      <article><aTitle>ELDERLY WOMAN WHO LIVED ALONE, DIED OF FIRE</aTitle>
    <abstract>APRIL 3, PREDAWN FIRE OCCURRED IN △△-KU, TOKYO,
AND ELDERLY WOMAN WHO LIVED ALONE WAS FOUND DEAD.
    </abstract><details>APRIL 3, 5 AM, PASSERBY FOUND SMOKE FROM 6TH FLOOR OF
APARTMENT IN 3-CHOME, △△-KU, TOKYO, AND REPORTED TO △△
POLICE OFFICE. △△ POLICE OFFICERS FOUND UNEMPLOYED MRS.
■○▲☆ DOWN AND DEAD IN HER KITCHEN. MRS. ■○ LIVED ALONE.
    </details></article>
  </contents>
</xmlDocument>
```

FIG. 30

```xml
<?xml version="1.0" encoding="Shift_JIS"?>
<xsl:stylesheet xmlns:xsl="http://www.w3.org/TR/WD-xsl" xml:lang="ja">
<xsl:template match="/">
    <html lang="ja">
    <head>
        <title><xsl:value-of select="xmlDocument/pageTitle"/></title>
    </head>
    <body>
        <div><xsl:apply-templates select="xmlDocument/contents"/>
        </div>
    </body>
    </html>
</xsl:template>

<xsl:template match="xmlDocument/contents">
    <xsl:for-each select="article">
        <h1><xsl:value-of select="aTitle"/></h1>
        <h2><xsl:value-of select="abstract"/></h2>
        <!--
            <text-to-speech><xsl:value-of select="abstract"/></text-to-speech>
            <text-to-speech><xsl:value-of select="details"/></text-to-speech>
        -->
    </xsl:for-each>
</xsl:template>
</xsl:stylesheet>
```

FIG. 31

○×NEWS  LOCAL NEWS PAGE

MIDTOWN CHERRY BLOSSOMS IN FULL BLOOM
   APRIL 3, IT BECAME AS WARM AS AT THE BEGINNING
   OF MAY IN KANTO AREA, AND CHERRY BLOSSOMS
   ARE IN FULL BLOOM.

ELDERLY WOMAN WHO LIVED ALONE, DIED OF FIRE
   APRIL 3, PREDAWN FIRE OCCURRED IN △△-KU,
   TOKYO, AND ELDERLY WOMAN WHO LIVED ALONE
   WAS FOUND DEAD.

FIG. 32

```xml
(sample.xsl)
<?xml version="1.0" encoding="Shift_JIS"?>
<?xml-stylesheet type="text/xsl" href="sample.xsl"?>
<xmlDocument>
  <pageTitle>PERSONAL INFORMATION</pageTitle>
  <contents>
    <persons>
      <tableTitle>PERSONAL DATA</tableTitle>
      <tableContents>
        <item>ID</item>
        <data>123-4567</data>
      </tableContents>
      <tableContents>
        <item>NAME</item>
        <data>○YAMA ×○</data>
      </tableContents>
      <tableContents>
        <item>GENDER</item>
        <data>MALE</data>
      </tableContents>
      <tableContents>
        <item>BIRTH DATE</item>
        <data>1964/01/23</data>
      </tableContents>
      <tableContents>
        <item>ADDRESS</item>
        <data>30-2, SHIMOMARUKO 3-CHOME, OTA-KU, TOKYO</data>
      </tableContents>
    </persons>
  </Contents>
</xmlDocument>
```

FIG. 33

(sample.xsl)

```
<?xml version="1.0" encoding="Shift_JIS"?>
<xsl:stylesheet xmlns:xsl="http://www.w3.org/TR/WD-xsl" xml:lang="ja">
<xsl:template match="/">
    <html lang="ja">
    <head>
        <title><xsl:value-of select="xmlDocument/pageTitle"/></title>
        <link rel="STYLESHEET" href="sample.css" type="text/css"/>
        <script language="JavaScript" src="sample.js">
    </head>
    <body>
        <div><xsl:apply-templates select="xmlDocument/contents/persons"/>
        </div>
    <form>
    <input type="button" value="REVERSE" onClick="reverseColor()">
    </form>    </body>
    </html>
</xsl:template>

<xsl:template match="xmlDocument/contents/persons">
    <h1><xsl:value-of select="tableTitle"/></h1>
    <table>
        <xsl:for-each select="tableContents">
        <tr>
            <th><xsl:value-of select="item"/></th>
            <td><xsl:value-of select="data"/></td>
        </tr>
        </xsl:for-each>
    </table>
</xsl:template>
</xsl:stylesheet>
```

FIG. 34

```
                (sample.html)
<html lang="ja">
<head>
<title>PERSONAL INFORMATION</title>
<link rel="STYLESHEET" href="sample.css" type="text/css"/>
<script language="JavaScript" src="sample.js">
</head>
<body>
    <div><h1>PERSONAL DATA</h1>
      <table>
        <tr><th>ID</th>
            <td>123-4567</td></tr>
        <tr><th>NAME</th>
            <td>○YAMA ×O</td></tr>
        <tr><th>GENDER</th>
            <td>MALE</td></tr>
        <tr><th>BIRTH DATE</th>
            <td>1964/01/23</td></tr>
        <tr><th>ADDRESS</th>
            <td>30-2, SHIMOMARUKO 3-CHOME, OTA-KU, TOKYO</td></tr>
      </table>
    </div>
    <form>
    <input type"button" value="REVERSE" onClick="reverseColor()">
    </form>
</body>
</html>
```

FIG. 35

```
               (sample.css)
    h1         {font-size:16pt;
               font-weight:bold;}
    table      {border-style:double;
               border-collapse:collapse;}
    th         {border-style:solid;}
    td         {border-style:solid;}
```

FIG. 36

```
(sample.js)
function reverseColor() {
        tmpColor=document.fgColor;
        document.fgColor=document.bgColor;
        document.bgColor;=tmpColor;
```

FIG. 37

PERSONAL DATA

| ID | 123-4567 |
|---|---|
| NAME | ○YAMA ×○ |
| GENDER | MALE |
| BIRTH DATE | 1964/1/23 |
| ADDRESS | 30-2, SHIMOMARUKO 3-CHOME, OTA-KU, TOKYO |

REVERSE ~ 2501

2500

MULTIMODAL DOCUMENT RECEPTION APPARATUS AND MULTIMODAL DOCUMENT TRANSMISSION APPARATUS, MULTIMODAL DOCUMENT TRANSMISSION/RECEPTION SYSTEM, THEIR CONTROL METHOD, AND PROGRAM

FIELD OF THE INVENTION

The present invention relates to a multimodal document reception apparatus for receiving a multimodal document that contains at least a description of an output style of text data from a multimodal document transmission apparatus via a network, a multimodal document transmission apparatus for generating a multimodal document and transmitting it to a multimodal document reception apparatus via a network, and a multimodal document transmission/reception system which is formed by connecting these multimodal document reception apparatus and multimodal document transmission apparatus via a network.

BACKGROUND OF THE INVENTION

With the popularization of the Internet, the world of Web browsing that displays documents, which are held in servers connected to the Internet and are described in HTML (Hyper Text Markup Language), on browsers of the personal computer is still growing.

In an HTML document, fields that describe a document structure and fields that describe an expression style are mixed due to its historical circumstance. As a format that separates the structure and style, CSS (Cascading Style Sheet) which extracts the expression style from the structure is also prevalent.

Even when CSS (expression style) is separated from HTML (document structure+expression style), since the document structure of HTML is designed in consideration of the expression style, a method of describing in XML (extensible Markup Language) that expresses only the tree structure of document contents, and XSL (extensible Stylesheet Language) that converts the tree structure into an expression style to be expressed is also spreading.

Java Script, VBScript, and the like are available as script languages which describe manipulations in HTML, and can describe in an HTML file or can be inserted as an external file.

FIGS. 32 and 33 show examples of documents described using XML and XSL, and FIGS. 34 to 37 respectively show examples of an HTML document and CSS file generated based on these documents, an example of a JavaScript file, and a display example of a browser.

Note that this browser is installed on a versatile computer such as a personal computer or the like. When the browser is launched in response to user's operation using an input device such as a mouse, keyboard, or the like, its browser window is displayed on a display.

When the user presses a "reverse" button 2501 on a browser window 2500 in FIG. 37, the contents of onClick in FIG. 34 are called, and the background and text colors in the browser window 2500 are reversed by a function (reverseColor ( )) described in JavaScript shown in FIG. 36.

As described above, when various stylesheets such as CSS, XSL, and the like are prepared, and are switched as needed, a single XML document that indicates only the tree structure of the document contents can be switched in accordance with purposes intended. Also, a script language can describe actions to be taken upon, e.g., depression of buttons.

Meanwhile, the performances of not only personal computers but also mobile terminals such as portable phones, PHS (Personal Handyphone System), PDA (Personal Digital Assistant), and the like, that users carry about everyday, have improved, and high-end mobile terminals have processing performance equivalent to that of a personal computer one generation before.

Such high-end mobile terminals have the following features.

(1) Mobile terminals can establish connection to a host computer via a public network or wireless LAN and can make data communications.

(2) Most of mobile terminals have audio input/output devices (microphone, loudspeaker, and the like).

However, the high-end mobile terminal has a small GUI (Graphic User Interface) window, i.e., poor display performance of GUI information. As commercially available mobile terminals, many non-high-end mobile terminals are present in addition to high-end terminals, and some of such mobile terminals cannot display GUI information.

Under such circumstances of mobile terminals, it is significant to implement a multimodal interface that can make some or all of operations and responses by means of speech.

Upon dealing with multimodal documents, some high-end mobile terminals can perform speech recognition and speech synthesis. However, the rest of mobile terminals cannot perform speech recognition and speech synthesis or can perform only poor speech recognition and speech synthesis.

However, technical advances and size reductions of hardware may allow models, which cannot perform an audio process so far, for the audio process. Most of mobile terminals have a small display screen due to portability. However, with the advent of high-definition display screens and lightweight hardware, even a mobile terminal can display many kinds of information on its display screen.

Furthermore, even with a mobile terminal having both audio and GUI modalities, the user may want to make a speech-only process in an environment in which he or she can hardly operate GUI or to make a GUI-only process in an environment in which he or she does not want to use speech inputs/outputs.

SUMMARY OF THE INVENTION

The present invention has been made in consideration of the above situation, and has as its object to provide a multimodal document reception apparatus and multimodal document transmission apparatus, a multimodal document transmission/reception system, their control method, and a program, which can provide an interface with an optimal modality in accordance with the modalities of individual terminals having a plurality of kinds of modalities, and those which the user wants to use.

According to the present invention, the foregoing object is attained by providing a multimodal document reception apparatus for receiving a multimodal document which contains at least a description of an output style of text data from a multimodal document transmission apparatus via a network, comprising; communication means for transmitting modality information indicating various functions of the multimodal document reception apparatus to the multimodal document transmission apparatus, and receiving a multimodal document, which is generated by the multimodal document transmission apparatus based on the modality information; speech synthesis means for synthesizing speech of text data to be output as speech in the multimodal document; speech output means for outputting output speech synthesized by the speech synthesis means; and display means for displaying text data to be displayed in the multimodal document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows an example of a multimodal document according to the first embodiment of the present invention;

FIG. 7 shows a GUI display example according to the first embodiment of the present invention;

FIG. 8 shows an example of an original document according to the first embodiment of the present invention;

FIG. 9 shows an example of a stylesheet according to the first embodiment of the present invention;

FIG. 10 shows an example of an HTML file according to the second embodiment of the present invention;

FIG. 11 shows an example of a script file according to the second embodiment of the present invention;

FIG. 12 shows a GUI display example according to the second embodiment of the present invention;

FIG. 13 shows another GUT display example according to the second embodiment of the present invention;

FIG. 14 shows an example of an HTML file according to the third embodiment of the present invention;

FIG. 15 shows a GUI display example according to the third embodiment of the present invention;

FIG. 16 shows another GUT display example according to the third embodiment of the present invention;

FIG. 17 shows still another GUI display example according to the third embodiment of the present invention;

FIG. 18 shows a GUT display example according to the fifth embodiment of the present invention;

FIG. 24 shows an example of modality information according to the sixth embodiment of the present invention;

FIG. 25 shows another example of modality information according to the sixth embodiment of the present invention;

FIG. 26 shows still another example of modality information according to the sixth embodiment of the present invention;

FIG. 27 shows an example of user setup information according to the sixth embodiment of the present invention;

FIG. 28 shows an example of modified user setup information according to the sixth embodiment of the present invention;

FIG. 29 shows an example of an original document according to the sixth embodiment of the present invention;

FIG. 30 shows an example of a stylesheet according to the sixth embodiment of the present invention;

FIG. 31 shows a GUI display example according to the sixth embodiment of the present invention;

FIG. 32 is a view for explaining prior art;

FIG. 33 is a view for explaining prior art;

FIG. 34 is a view for explaining prior art;

FIG. 35 is a view for explaining prior art;

FIG. 36 is a view for explaining prior art; and

FIG. 37 is a view for explaining prior art.

DETAILED DESCRIPTION OF THE PREFERRED EMBODIMENTS

Preferred embodiments of the present invention will be described in detail hereinafter with reference to the accompanying drawings.

<First Embodiment>

Figure 1:
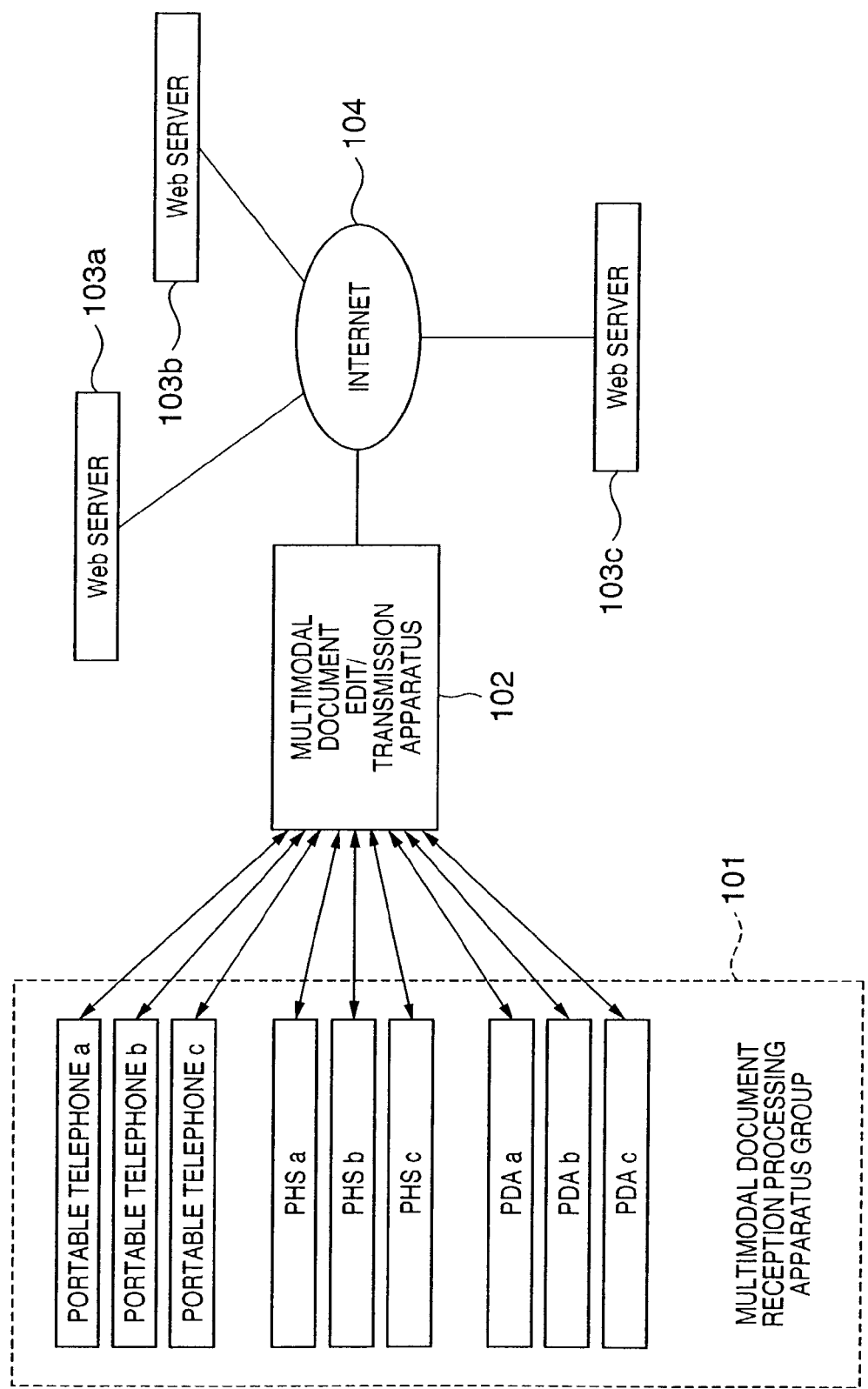
FIG. 1 is a block diagram of a multimodal document transmission/reception system according to the first embodiment of the present invention.

FIG. 1 is a block diagram of a multimodal document transmission/reception system according to the first embodiment of the present invention.

Referring to FIG. 1, reference numeral 101 denotes a multimodal document reception processing apparatus group, which includes mobile terminals such as portable phones (a to c), PHSs (a to c), PDAs (a to c), and the like, and will be described in detail later using FIG. 2.

Reference numeral 102 denotes a multimodal document edit/transmission apparatus which communicates with the multimodal document reception processing apparatuses 101, acquires original documents to be edited (e.g., various document data such as HTML documents, XML documents, files and the like on Web/FTP sites managed by Web servers) from external Web servers 103a to 103c, and generate multimodal documents. The multimodal document edit/transmission apparatus 102 will be described in detail later using FIG. 3.

Note that the multimodal document reception processing apparatuses 101 and multimodal document edit/transmission apparatus 102 can make data communications via a network such as a public line, wireless LAN, or the like. Each of the multimodal document reception processing apparatuses 101 and multimodal document edit/transmission apparatus 102 has standard building components (e.g., a CPU, RAM, ROM, hard disk, external storage device, network interface, display, keyboard, mouse, and the like) equipped in a versatile computer and portable terminal. Furthermore, various functions to be implemented by the multimodal document reception processing apparatuses 101 and multimodal document edit/transmission apparatus 102 may be implemented by executing a program stored in a ROM or external storage device in each apparatus by a CPU or by dedicated hardware.

The functions of the Web servers may be combined with the multimodal document edit/transmission apparatus 102. In this case, the multimodal document edit/transmission apparatus 102 generates multimodal documents based on original documents managed by itself.

The detailed arrangement of one of the multimodal document reception processing apparatuses 101 will be described below using FIG. 2.

Figure 2:
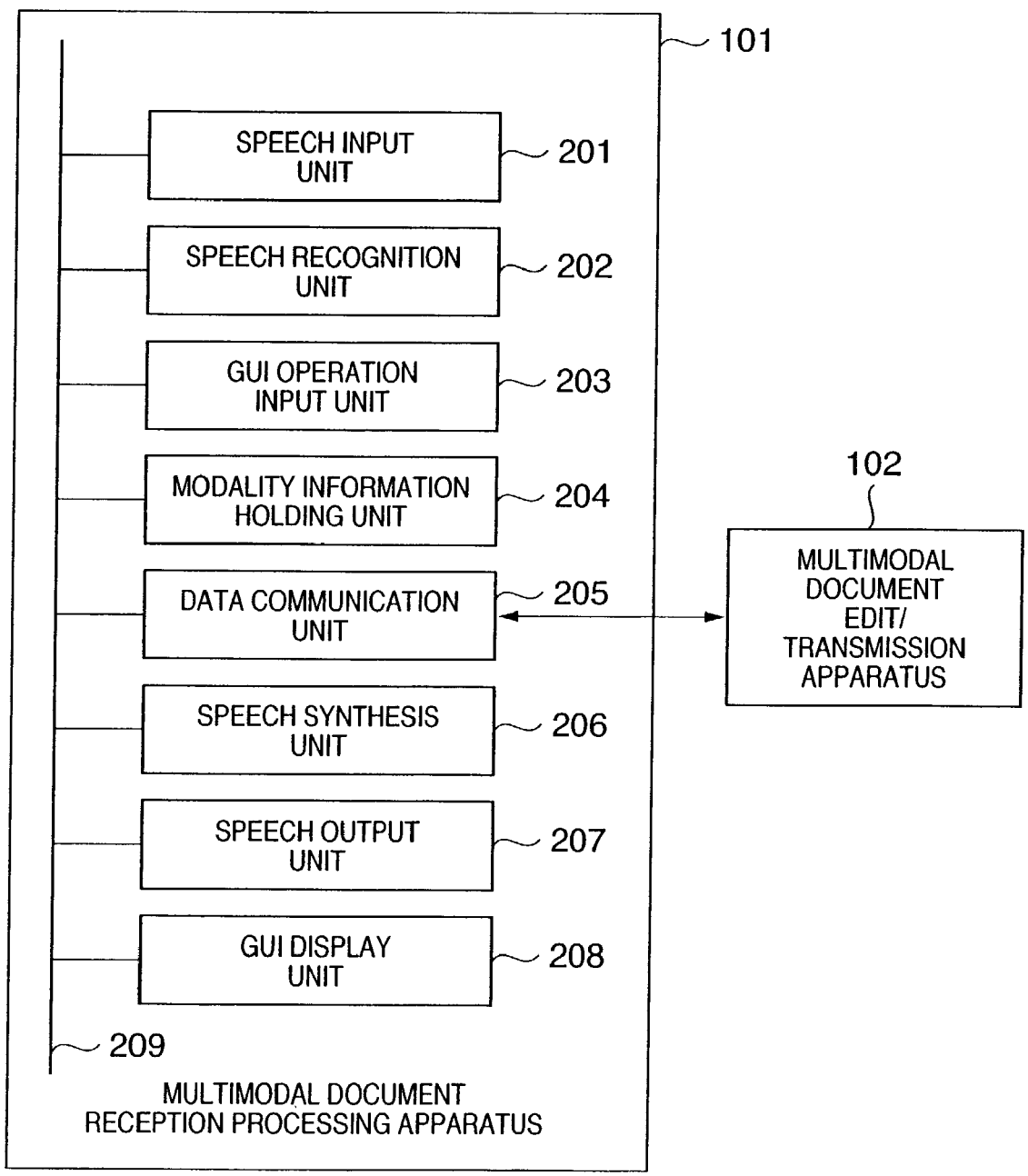
FIG. 2 is a detailed block diagram of a multimodal document reception processing apparatus according to the first embodiment of the present invention.

FIG. 2 is a detailed block diagram of the multimodal document reception processing apparatus according to the first embodiment of the present invention.

Referring to FIG. 2, reference numeral 201 denotes a speech input unit with which the user inputs speech via a microphone. Reference numeral 202 denotes a speech recognition unit for executing a recognition process of speech input from the speech input unit 201. The speech recognition result of the speech recognition unit 202 is equated with a text input via a GUI.

Reference numeral 203 denotes a GUI operation input unit for inputting GUI operations by means of a pointing device such as a stylus or the like, buttons of a ten-key pad, and the like.

Note that the GUI operations include various operations such as access operations to Web sites on an Internet 104 managed by the Web servers 103*a* to 103*c*, a change operation of modality information (to be described later), and the like.

Reference numeral 204 denotes a modality information holding unit for holding modality information indicating various functions such as a speech recognition function, speech synthesis function, GUI display function, and the like, which are used by the multimodal document reception processing apparatus 101.

Reference numeral 205 denotes a data communication unit for transmitting an input GUI operation and modality information held by the modality information holding unit 204 to the multimodal document edit/transmission apparatus 102, and receiving a multimodal document or script file that describes an input/output style (e.g., display, speech input/output, print, or the like) of text data from the multimodal document edit/transmission apparatus 102.

Reference numeral 206 denotes a speech synthesis unit for synthesizing speech of text data to be output as speech in a multimodal document received by the data communication unit 205. Reference numeral 207 denotes a speech output unit for outputting output speech synthesized by the speech output unit 207 via a loudspeaker or earphone.

Reference numeral 208 denotes a GUI display unit such as a Web browser or the like for displaying GUI display data in a multimodal document received by the data communication unit 205.

Reference numeral 209 denotes a bus that interconnects the building components 201 to 208 of the multimodal document reception processing apparatus 101.

The detailed arrangement of the multimodal document edit/transmission apparatus 102 will be described below using FIG. 3.

Figure 3:
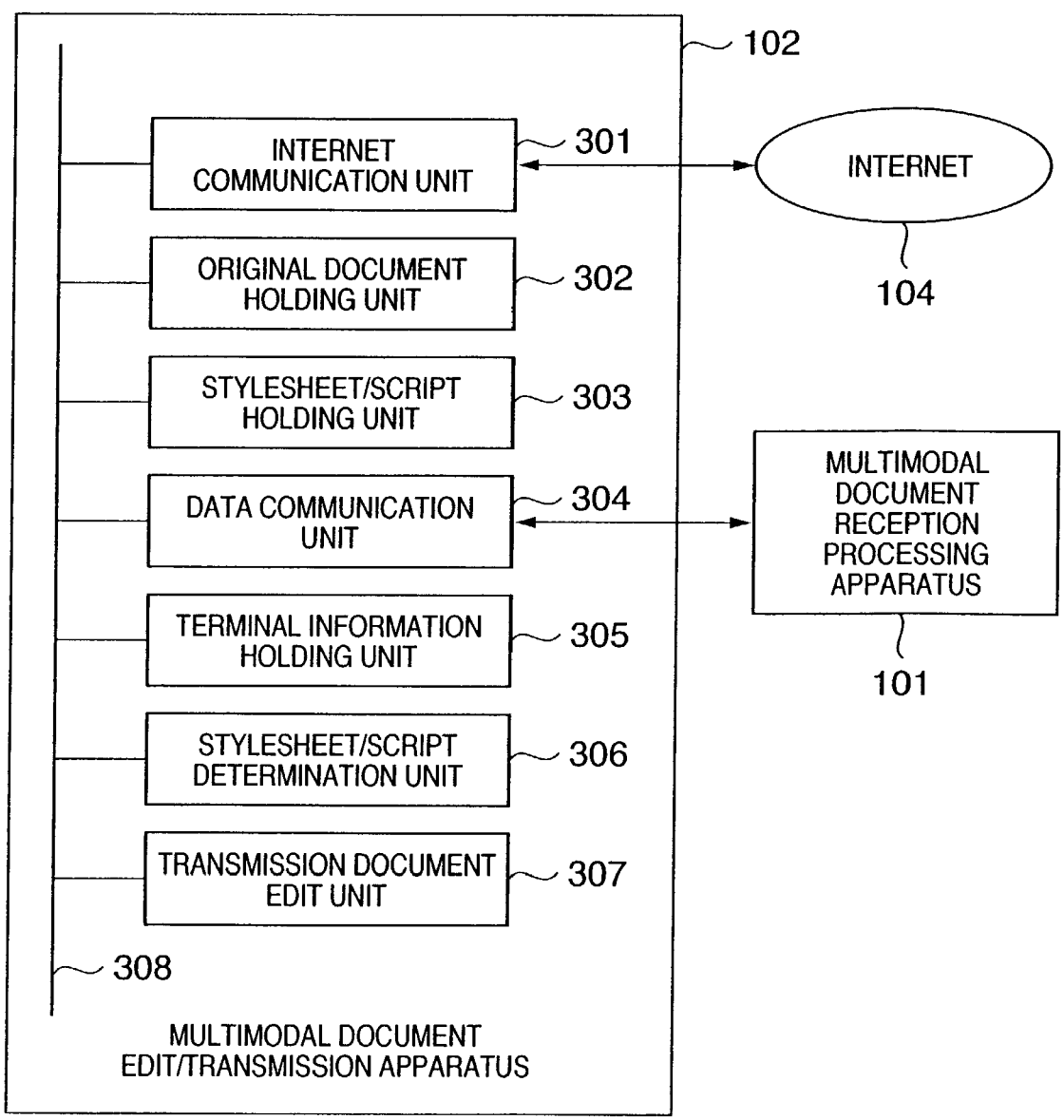
FIG. 3 is a detailed block diagram of a multimodal document edit/transmission apparatus according to the first embodiment of the present invention.

FIG. 3 is a detailed block diagram of the multimodal document edit/transmission apparatus according to the first embodiment of the present invention.

Referring to FIG. 3, reference numeral 301 denotes an Internet communication unit for receiving an original document from an external Web server (e.g., 103*a*) via the Internet 104.

Reference numeral 302 denotes an original document holding unit for holding the original document acquired by the Internet communication unit 301. Reference numeral 303 denotes a stylesheet/script holding unit for holding an edit/manipulation file including stylesheets used to edit original documents held by the original document holding unit 302, and script files that describe manipulations of the original documents.

Reference numeral 304 denotes a data communication unit for receiving GUI operation information and modality information from the multimodal document reception processing apparatus 101, and transmitting a multimodal document, stylesheet, and script file to the multimodal document reception processing apparatus 101.

Reference numeral 305 denotes a terminal information holding unit for holding terminal information and modality information, which are received by the data communication unit 304 and are used to specify the multimodal document reception processing apparatus 101, for each individual multimodal document reception processing apparatus 101. Note that the terminal information holding unit 305 specifies each multimodal document reception processing apparatus 101 using a telephone number if the apparatus 101 is connected via a public line, or using an IP address if the apparatus 101 is connected via a wireless LAN or the like, and holds terminal information of each individual multimodal document reception processing apparatus 101.

Reference numeral 306 denotes a stylesheet/script determination unit for determining a stylesheet to be applied to an original document to be transmitted and a script file to be appended to the original document, on the basis of the modality information of the multimodal document reception processing apparatus 101 in communication, which is stored in the terminal information holding unit 305.

Reference numeral 307 denotes a transmission document edit unit for editing an original document, which is obtained based on the operation input received by the data communication unit 304 and is held by the original document holding unit 302, by applying the stylesheet and script file determined by the stylesheet/script determination unit 306, so as to generate a multimodal document.

Reference numeral 308 denotes a bus that interconnects the building components 301 to 307 of the multimodal document edit/transmission apparatus 102.

The operation of the multimodal document reception processing apparatus 101 will be described below using FIG. 4.

Figure 4:
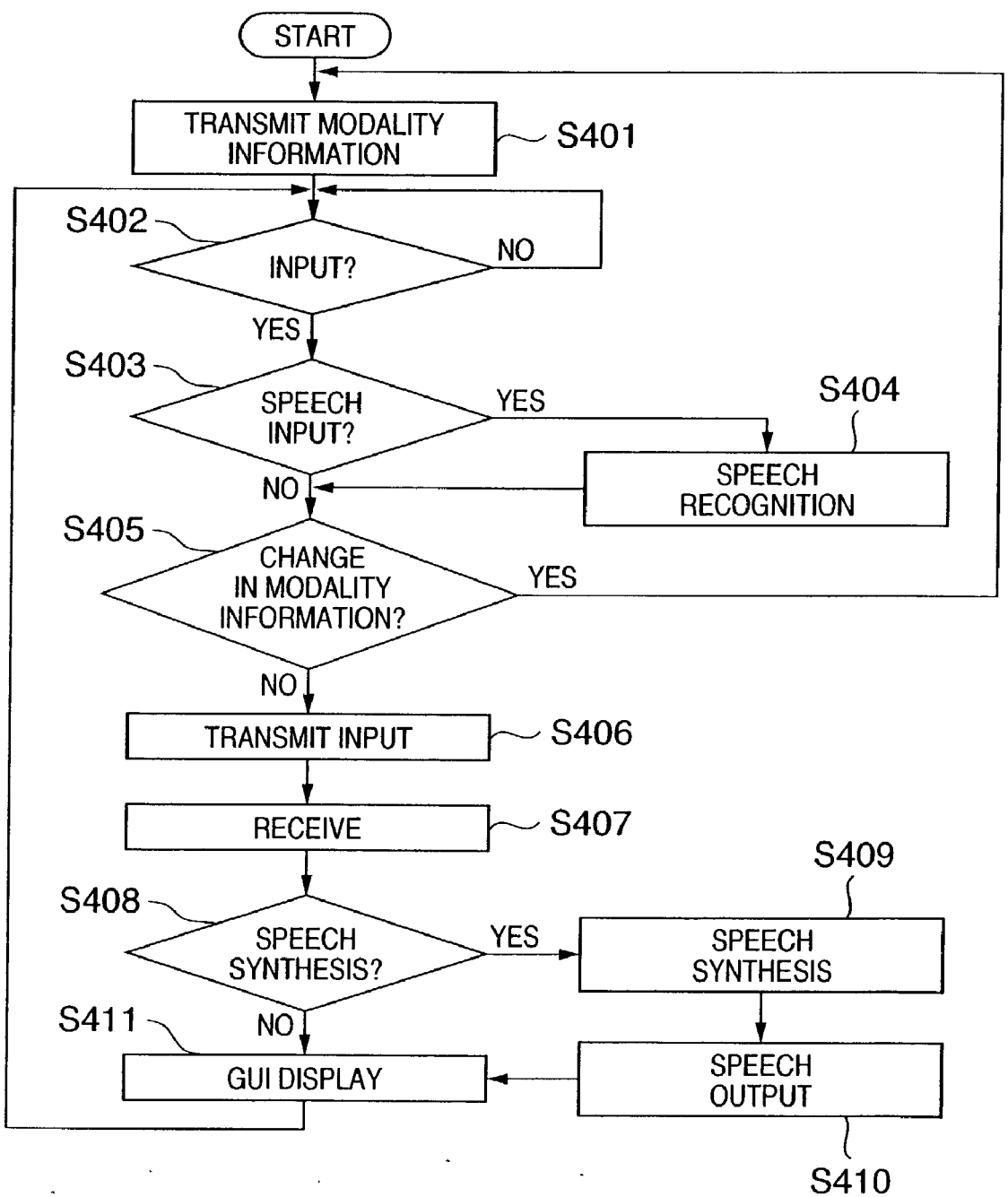
FIG. 4 is a flow chart showing the operation flow of the multimodal document reception processing apparatus according to the first embodiment of the present invention.

FIG. 4 is a flow chart showing the operation flow of the multimodal document reception processing apparatus according to the first embodiment of the present invention.

In step S401, the data communication unit 205 transmits modality information held by the modality information holding unit 204 to the multimodal document edit/transmission apparatus 102.

In step S402, the control waits for user's input. If user's input is detected (YES in step S402), the flow advances to step S403.

It is checked in step S403 if the user's input is a speech input. If the user's input is a speech input (YES in step S403), the flow advances to step S404, and the speech recognition unit 202 recognizes input speech to obtain a speech recognition result as user's GUI operation. The flow then advances to step S405. On the other hand, if the user's input is not a speech input (NO in step S403), the flow advances to step S405.

Note that the checking step S403 is implemented based on the presence/absence of input from the speech input unit 201.

It is checked in step S405 if the user's input is a change in modality information. If the user's input is a change in modality information (YES in step S405), the flow returns to step S401. On the other hand, if the user's input is not a change in modality information, the flow advances to step S406.

In step S406, the data communication unit 205 transmits the user's input (e.g., a multimodal document request) to the multimodal document edit/transmission apparatus 102. In step S407, the data communication unit 205 receives a multimodal document from the multimodal document edit/transmission apparatus 102.

It is checked in step S408 if the received multimodal document contains text data which is to undergo speech synthesis. If the received multimodal document contains text data which is to undergo speech synthesis (YES in step S408), the flow advances to step S409, and the speech synthesis unit 206 synthesizes speech of the text data which is to undergo speech synthesis. In step S410, the speech output unit 207 outputs the synthesized speech data.

Note that the checking process in step S408 is done by seeing if a speech synthesis function is held as modality information by the modality information holding unit 204, and the multimodal document received from the multimodal document edit/transmission apparatus 102 contains a predetermined tag (e.g., "<voice>" tag to be described later) for speech synthesis.

On the other hand, if it is determined in step S408 that the received multimodal document does not contain any text data which is to undergo speech synthesis (NO in step S408), the flow advances to step S411, and the GUI display unit 208 makes GUI display based on GUI display data in the received multimodal document. The flow then returns to step S402.

The operation of the multimodal document edit/transmission apparatus 102 will be explained below using FIG. 5.

Figure 5:
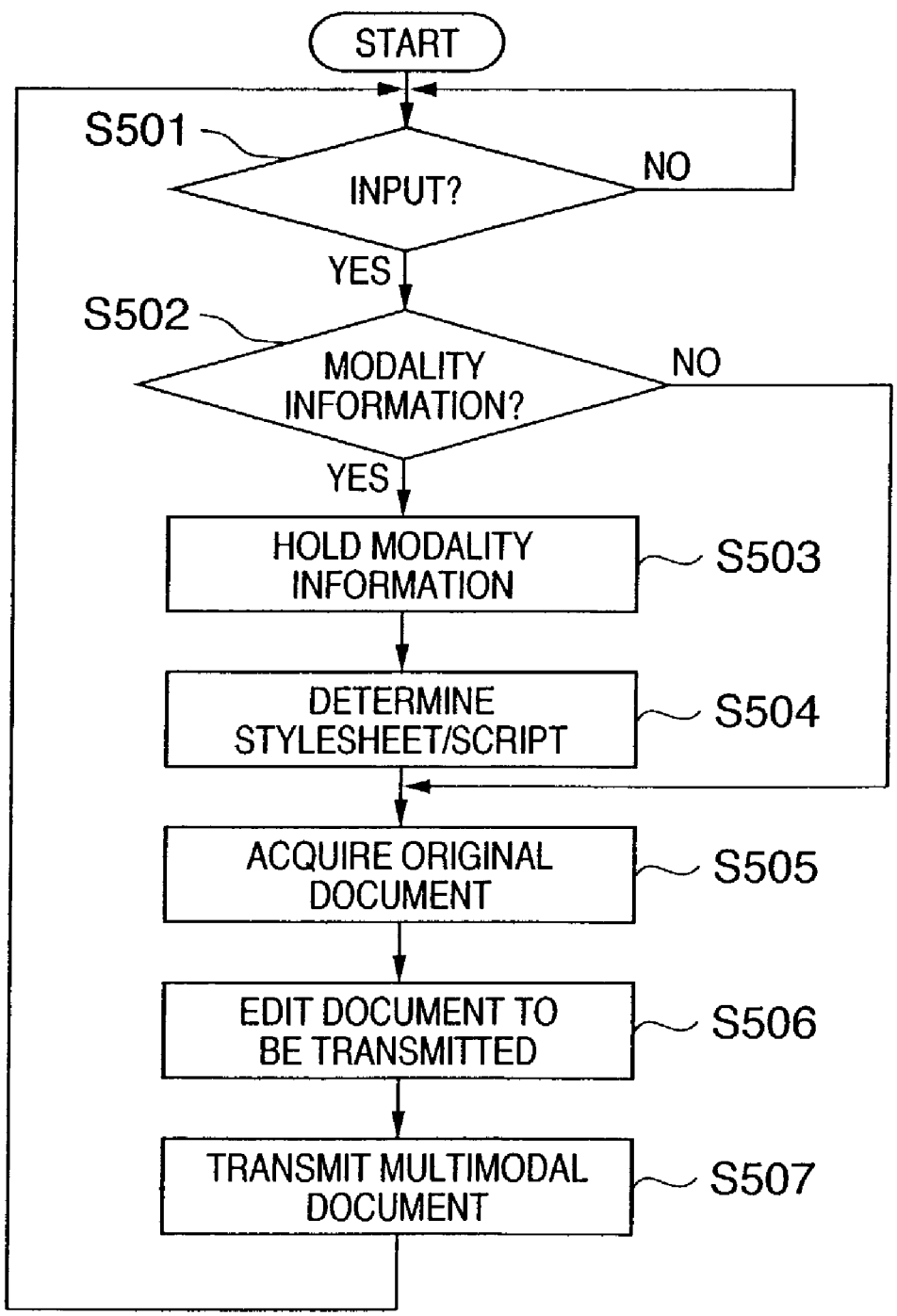
FIG. 5 is a flow chart showing the operation flow of the multimodal document edit/transmission apparatus according to the first embodiment of the present invention.

FIG. 5 is a flow chart showing the operation flow of the multimodal document edit/transmission apparatus according to the first embodiment of the present invention.

In step S501, the data communication unit 304 waits for an input from the multimodal document reception processing apparatus 101. If an input is detected (YES in step S501), the flow advances to step S502.

It is checked in step S502 if the input from the multimodal document reception processing apparatus 101 is modality information. If the input is not modality information (NO in step S502), the flow jumps to step S505. On the other hand, if the input is modality information (YES in step S502), the flow advances to step S503, and the terminal information holding unit 305 holds that modality information and terminal information of the multimodal document reception processing apparatus 101. In step S504, a stylesheet and script to be applied to an original document to be transmitted are determined based on the received modality information.

In step S505, the Internet communication unit 301 acquires an original document via the Internet 104 on the basis of the input from the multimodal document reception processing apparatus 101, and holds it in the original document holding unit 302. In step S506, the transmission document edit unit 307 executes a transmission document edit process for applying the stylesheet determined by the stylesheet/script determination unit 306 to the original document held by the original document holding unit 302, thus generating a multimodal document.

In step S507, the data communication unit 304 transmits the multimodal document edited by the transmission document edit unit 307 to the multimodal document reception processing apparatus 101, and the flow returns to step S501.

An example of a multimodal document to be transmitted from the multimodal document edit/transmission apparatus 102 to each multimodal document reception processing apparatus 101 will be described below using FIG. 6.

FIG. 6 shows an example of a multimodal document according to the first embodiment of the present invention.

Referring to FIG. 6, text data bounded by "<voice>" and "</voice>" tags is that to be output as speech. The speech synthesis unit 206 synthesizes speech of this text data, which is output from the speech output unit 207. Text data bounded by "<h1>" and "</h1>" tags and by "<h2>" and "</h2>" tags are those to be displayed (GUI display data), and the GUI display unit 208 makes display, as shown in FIG. 7.

Note that an example of an original document and an example of a stylesheet to be applied to the original document are shown in FIGS. 8 and 9, and the transmission document edit unit 307 generates the multimodal document shown in, e.g., FIG. 6, on the basis of these original document and stylesheet.

In this example, the multimodal document edit/transmission apparatus 102 determines based on the modality information of the multimodal document reception processing apparatuses 101 that the multimodal document reception processing apparatuses 101 have the speech synthesis function and GUI display function. FIG. 9 shows a style sheet that specifies text data bounded by "<pageTitle>" and "</pageTitle>" tags, "<aTitle>" and "</aTitle>" tags, and "" and "" tags as GUT display data, and specifies text data bounded by "<details>" and "</details>" tags as text data to be output as speech.

As described above, according to the first embodiment, each multimodal document reception processing apparatus 101 sends modality information that the self apparatus uses to the multimodal document edit/transmission apparatus 102. The multimodal document edit/transmission apparatus 102 determines a stylesheet and script file to be applied to an original document to be transmitted on the basis of the received modality information, and sends back a multimodal document obtained by editing the original document and the script file if necessary on the basis of the determination result to the multimodal document reception processing apparatus 101. The multimodal document reception processing apparatus 101 can make multimodal output on the basis of the received multimodal document and script file.

That is, an optimal user interface environment can be provided to a terminal in accordance with the modalities of each individual terminal (multimodal document reception processing apparatus 101), which can communicate with a host computer (multimodal document edit/transmission apparatus 102) via a public line, wireless LAN, or the like, and has various modalities, or modalities that the user wants to use.

<Second Embodiment>

In the description of the first embodiment, the multimodal document reception processing apparatus 101 has modality information including the speech synthesis function and GUI display function. On the other hand, a multimodal document reception processing apparatus 101 which does not have any speech synthesis function can make GUI display shown in FIG. 12 on the basis of, e.g., an HTML file shown in FIG. 10 and a script file shown in FIG. 11.

In this case, all text data bounded by respective pairs of tags in the HTML file in FIG. 10 are GUI display data, and the script file in FIG. 11 is programmed to make GUI display shown in FIG. 12, and that shown in FIG. 13 when the user changes a menu in GUI display in FIG. 12 from "summary" to "details".

<Third Embodiment>

When the multimodal document reception processing apparatus 101 has a small display screen like that of a portable terminal, GUI display shown in FIG. 15 can be made on the basis of, e.g., a script file shown in FIG. 11 and an HTML file shown in FIG. 14.

In this case, the contents of GUI display can change as shown in FIGS. 16 and 17 when the user selects menu items "headline", "summary", and "details" in GUI display in FIG. 15 in turn. That is, controls such as menus, buttons, and the like, which control to display/non-display text data to be displayed, are formed in GUI display data.

<Fourth Embodiment>

In the first embodiment, when a multimodal document is output to the multimodal document reception processing apparatus 101 having the speech synthesis unit 206, GUI display data and text data which is to undergo speech synthesis in that multimodal document are respectively output. However, the output styles of the GUI data and text data which is to undergo speech synthesis are not limited to such specific styles. For example, upon outputting a multimodal document for the first time, a speech synthesis execution button (control) that controls whether or not to execute speech synthesis may be displayed on a GUI by the same method described in the second and third embodiments without synthesizing speech of text data which is to undergo speech synthesis, and speech synthesis of that text data may be executed only when the user presses the speech synthesis execution button on GUI display.

<Fifth Embodiment>

Figure 19:
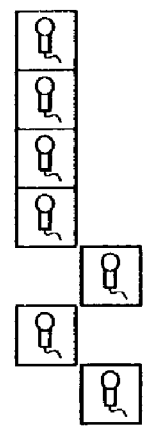
FIG. 19 shows another GUI display example according to the fifth embodiment of the present invention.

As for the presence/absence of the speech recognition unit 202 in the multimodal document reception processing apparatus 101, if the apparatus 101 has no speech recognition unit 202, GUI display shown in, e.g., FIG. 18 is made. However, if the apparatus 101 has the speech recognition unit 202, buttons (i.e., icons that represent microphones) may be displayed at positions where speech recognition can be made, as shown in, e.g., FIG. 19, so as to inform the user that speech synthesis is allowed.

<Sixth Embodiment>

In the first to fifth embodiments, the multimodal document transmission/reception system implemented when each multimodal document reception processing apparatus 101 has the speech recognition function and speech synthesis function has been explained. However, in some cases, the multimodal document reception processing apparatus 101 has a speech input function but has neither the speech recognition function nor speech synthesis function or has poor ones if it has, and GUI operations by means of speech input/output are to be implemented in such multimodal document reception processing apparatus 101.

In the sixth embodiment, as an application example of the first embodiment, even when the multimodal document reception processing apparatus 101 has a speech input function but has neither the speech recognition function nor speech synthesis function or has poor ones if it has, and GUI operations by means of speech input/output are to be implemented in such multimodal document reception processing apparatus 101, a multimodal document transmission/reception system that can obtain the same effect as in the first embodiment by executing speech recognition and speech synthesis on the multimodal document edit/transmission apparatus 102 side will be explained.

In the multimodal document transmission/reception system of the sixth embodiment, speech data to be exchanged between the multimodal document reception processing apparatus 101 and multimodal document edit/transmission apparatus 102 uses encoded digital speech data. Hence, data security can be assured.

The detailed arrangement of one of the multimodal document reception processing apparatuses 101 will be described below using FIG. 20.

Figure 20:
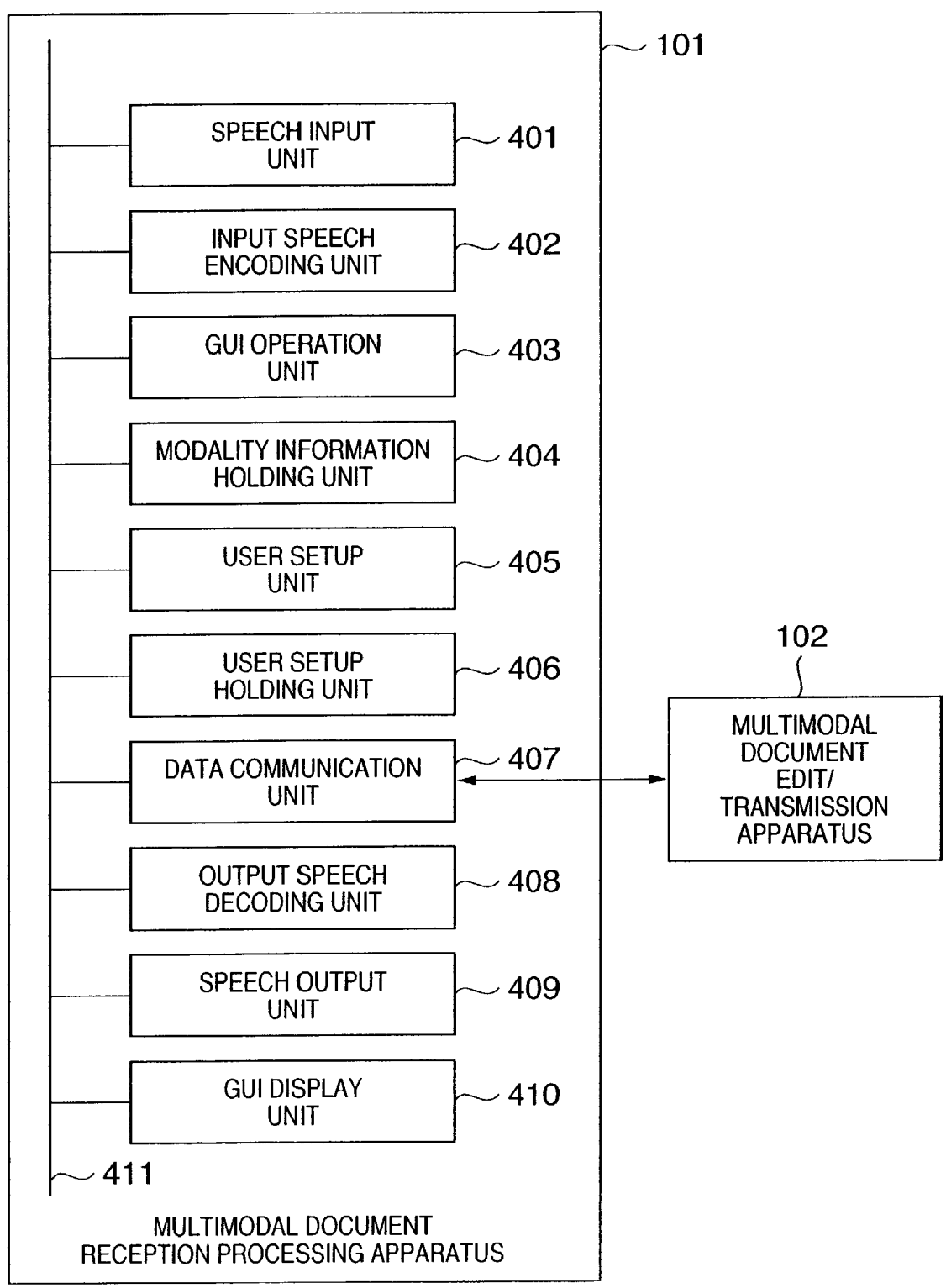
FIG. 20 is a detailed block diagram of a multimodal document reception processing apparatus according to the sixth embodiment of the present invention.

FIG. 20 is a detailed block diagram of the multimodal document reception processing apparatus according to the sixth embodiment of the present invention.

Referring to FIG. 20, reference numeral 401 denotes a speech input unit with which the user inputs speech via a microphone. Reference numeral 402 denotes an input speech encoding unit for encoding speech input from the speech input unit 401.

Reference numeral 403 denotes a GUI operation input unit for inputting GUI operations by means of a pointing device such as a stylus or the like, buttons of a ten-key pad, and the like. Reference numeral 404 denotes a modality information holding unit for holding modality information indicating various effective functions of the multimodal document reception processing apparatus 101.

FIGS. 24 to 26 show examples of modality information respectively when the multimodal document reception processing apparatus 101 is a portable phone, PHS, and PDA.

For example, FIG. 24 shows modality information when the multimodal document reception processing apparatus 101 is a portable phone. In FIG. 24, the input and output functions of the multimodal document reception processing apparatus 101 are described using an XML document.

Reference numeral 2410 denotes a description indicating the input function. Fields bounded by pairs of tags in lines 2411 to 2416 in this description 2410 correspond to detailed descriptions of practical input functions. The description 2410 includes descriptions indicating that input functions of speech input via a microphone (2411), text input via a ten-key pad (2412), pointing such as selection of items using a button (2413), movement of focus using a 4-way button (2414), and vertical screen scroll using a 2-way button (2416) are available, and a description indicating that horizontal screen scroll is not available (2415).

On the other hand, reference numeral 2420 denotes a description indicating the output function. Fields bounded by pairs of tags in lines 2421 to 2425 in this description 2420 correspond to detailed descriptions of practical output functions. The description 2420 includes descriptions indicating that output functions of speech output via a loudspeaker (2421), speech output via an earphone (2422), screen type=bitmap (2423), screen size=100 dots×120 dots (2424), and 16-level RGB color (2425) are available.

Likewise, descriptions of FIGS. 25 and 26 can be explained according to that of FIG. 24, and a detailed description thereof will be omitted.

The description will revert to FIG. 20.

Reference numeral 405 denotes a user setup unit for setting a speech output style to be output from a speech output unit 409 (to be described later) and a GUI display style to be displayed by a GUI display unit 410 using the speech input unit 401 and GUI operation input unit 403 for each user. Reference numeral 406 denotes a user setup holding unit for holding user setup information set by the user setup unit 405.

FIG. 27 shows an example of default values of the user setup information held by the user setup holding unit 406, and FIG. 28 shows an example when the user has modified that user setup information.

In an example of the default values of the user setup information shown in FIG. 27, reference numeral 2710 denotes a description indicating an input function. Fields bounded by pairs of tags in lines 2711 to 2715 in this description 2710 correspond to detailed descriptions of practical input functions. The description 2710 includes descriptions indicating that microphone=on (2711), text input=speech (2712), pointing=speech & button (2713), focus movement=4-way button (2714), and vertical scroll=2-way button (2715).

On the other hand, reference numeral 2720 denotes a description indicating an output function. Fields bounded by pairs of tags in lines 2721 to 2725 in this description 2720 correspond to detailed descriptions of practical output functions. In this case, the description 2720 includes descriptions indicating that loudspeaker=on (2721), earphone=off (2722), large character=display on screen (2723), middle character=display on screen & speech output (2724), and small character=speech output (2725).

By contrast, in an example of the modified user setup information shown in FIG. 28, all descriptions that pertain to input/output means in the user setup information in FIG. 27 are modified to those via speech.

The description will revert to FIG. 20.

Reference numeral 407 denotes a data communication unit for transmitting encoded input speech data generated by the input speech encoding unit 402, GUI operation information input by the GUI operation input unit 403, modality information held by the modality information holding unit 404, and user setup information held by the user setup holding unit 406 to the multimodal document edit/transmission apparatus 102, and receiving a multimodal document that include encoded output speech data and GUI display data from the multimodal document edit/transmission apparatus 102.

Reference numeral 408 denotes an output speech decoding unit for decoding encoded output speech data received by the data communication unit 407. Reference numeral 409 denotes a speech output unit for outputting output speech decoded by the output speech decoding unit 408 via a loudspeaker or earphone.

Reference numeral 410 denotes a GUI display unit such as a Web browser or the like for displaying GUI display data in a multimodal document received by the data communication unit 407.

Reference numeral 411 denotes a bus that interconnects the building components 401 to 410 of the multimodal document reception processing apparatus 101.

The detailed arrangement of the multimodal document edit/transmission apparatus 102 will be described below using FIG. 21.

Figure 21:
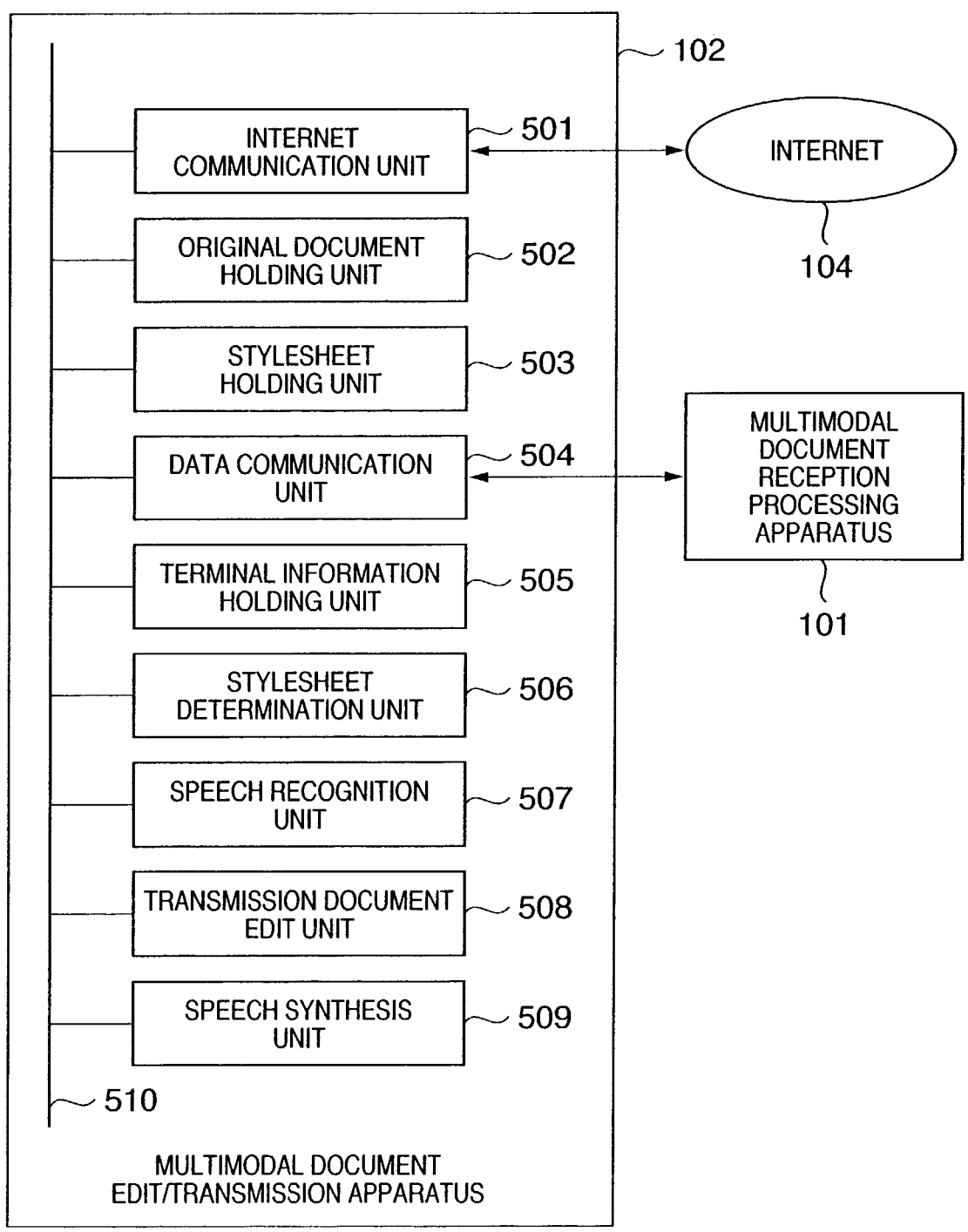
FIG. 21 is a detailed block diagram of a multimodal document edit/transmission apparatus according to the sixth embodiment of the present invention.

FIG. 21 is a detailed block diagram of the multimodal document edit/transmission apparatus according to the sixth embodiment of the present invention.

Referring to FIG. 21, reference numeral 501 denotes an Internet communication unit for receiving an original document from an external Web server (e.g., 103*a*) via the Internet 104.

Reference numeral 502 denotes an original document holding unit for holding the original document acquired by the Internet communication unit 501. Reference numeral 503 denotes a stylesheet holding unit for holding stylesheets used to edit original documents held by the original document holding unit 502.

Reference numeral 504 denotes a data communication unit for receiving encoded input speech data, GUI operation information, modality information, and user setup information from the multimodal document reception processing apparatus 101, and transmitting encoded output speech data and GUI display data (to be described later) to the multimodal document reception processing apparatus 101.

Reference numeral 505 denotes a terminal information holding unit for holding the modality information and user setup information, which are received by the data communication unit 504 and are used to specify the multimodal document reception processing apparatus 101, for each individual multimodal document reception processing apparatus 101. Furthermore, the terminal information holding unit 505 specifies each multimodal document reception processing apparatus 101 using a telephone number if the apparatus 101 is connected via a public line, or using an IP address if the apparatus 101 is connected via a wireless LAN or the like, and holds terminal information of each individual multimodal document reception processing apparatus 101.

Reference numeral 506 denotes a stylesheet determination unit for determining a stylesheet to be applied to an original document to be transmitted on the basis of the modality information and user setup information of the multimodal document reception processing apparatus 101 in communication, which are stored in the terminal information holding unit 505.

Reference numeral 507 denotes a speech recognition unit for making speech recognition of the encoded input speech data received by the data communication unit 504. Reference numeral 508 denotes a transmission document edit unit for editing an original document to be transmitted, which is obtained based on speech recognized by the speech recognition unit 507 and the GUI operation information received by the data communication unit 504, by applying the stylesheet determined by the stylesheet determination unit 506, so as to generate a multimodal document.

Reference numeral 509 denotes a speech synthesis unit for generating encoded output speech data of text data which is to be output as speech in the multimodal document edited by the transmission document edit unit 508.

Reference numeral 510 denotes a bus that interconnects the building components 501 to 509 of the multimodal document edit/transmission apparatus 102.

The operation of the multimodal document reception processing apparatus 101 will be described below using FIG. 22.

Figure 22:
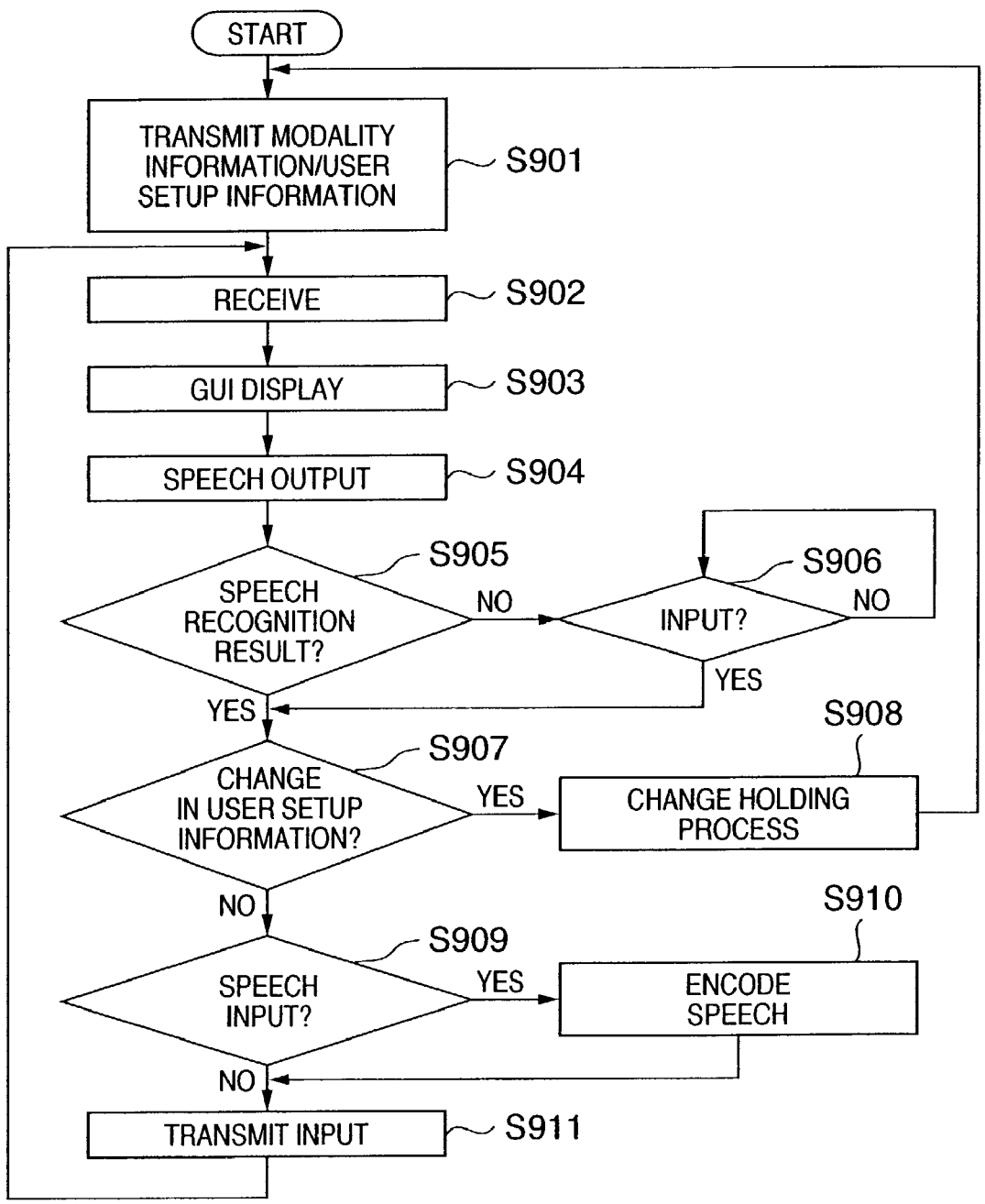
FIG. 22 is a flow chart showing the operation flow of the multimodal document reception processing apparatus according to the sixth embodiment of the present invention.
Figure 23:
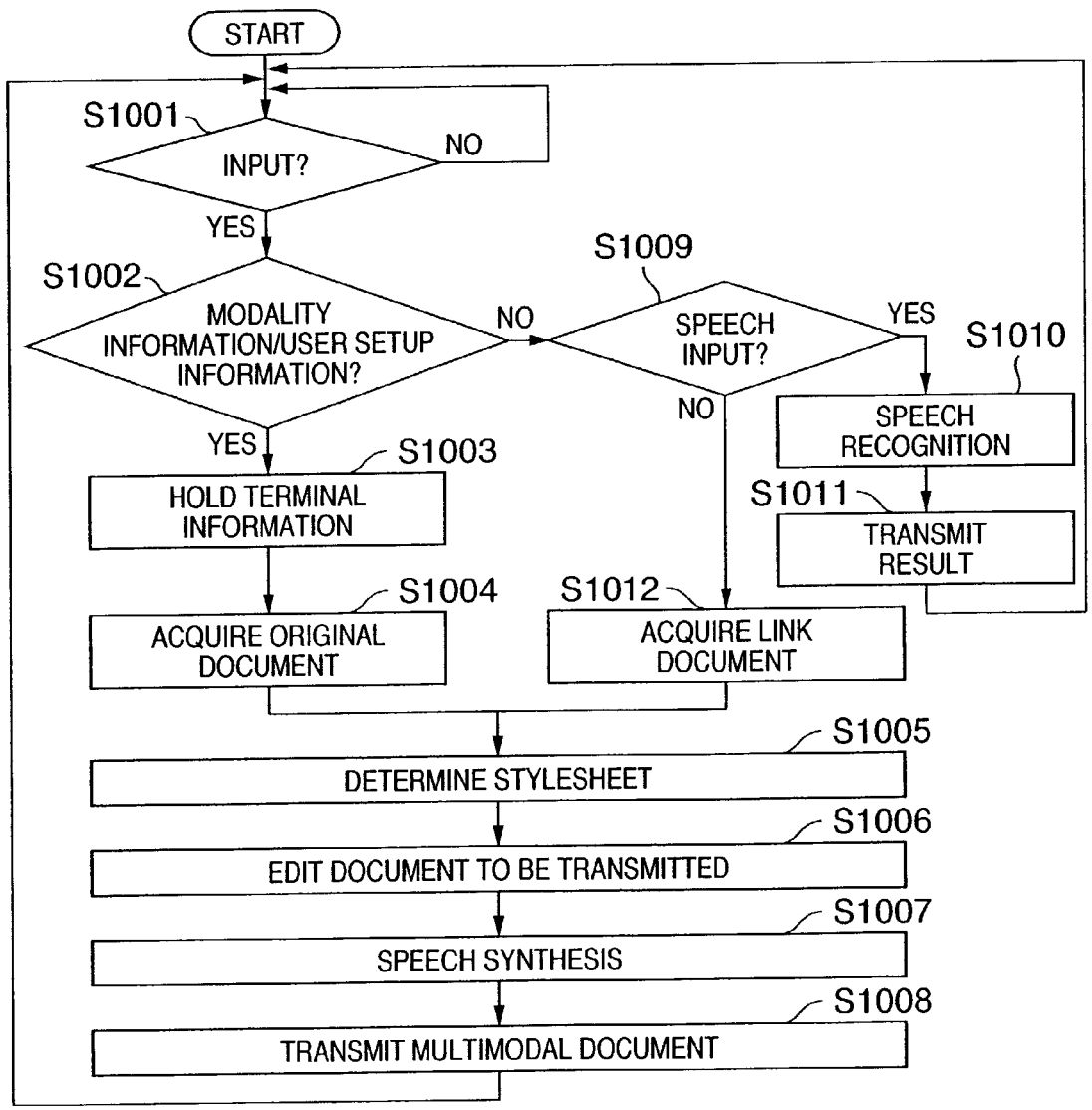
FIG. 23 is a flow chart showing the operation flow of the multimodal document edit/transmission apparatus according to the sixth embodiment of the present invention.

FIG. 22 is a flow chart showing the operation flow of the multimodal document reception processing apparatus according to the sixth embodiment of the present invention.

In step S901, the data communication unit 407 transmits modality information held by the modality information holding unit 404 and user setup information held by the user setup holding unit 406 to the multimodal document edit/transmission apparatus 102.

In step S902, the data communication unit 407 receives a multimodal document and encoded output speech data or a speech recognition result corresponding to text data to be output as speech in that multimodal document from the multimodal document edit/transmission apparatus 102. In step S903, the GUI display unit 410 makes GUI display based on GUI display data in the multimodal document. In step S904, the output speech decoding unit 408 decodes 102 makes speech recognition and speech synthesis, the same effect as in the first embodiment can be obtained even when the multimodal document reception processing apparatus 101 has a speech input function but has neither the speech recognition function nor speech synthesis function or has poor ones if it has, and GUI operations by means of speech input/output are to be implemented in such multimodal document reception processing apparatus 101.

<Seventh Embodiment>

In the sixth embodiment, the modality information in FIG. 24 and the user setup information in FIG. 27 have been exemplified. If modality information and user setup information other than those described above are used, the same process can be applied if stylesheet corresponding to such information are prepared.

<Eighth Embodiment>

In the sixth embodiment, one, combined stylesheet is applied to an original document for the sake of simplicity. Alternatively, stylesheets may be prepared in correspondence with tags, and a plurality of stylesheets may be applied.

<Ninth Embodiment>

In the sixth embodiment, the stylesheet in FIG. 30 corresponding to the original document in FIG. 29 is transmitted to the multimodal document reception processing apparatus 101 while containing a description indicating that the contents within "<text-to-speech>" tags in the multimodal document are excluded from GUI display data. Alternatively, in order to reduce the data size of the multimodal document itself, a multimodal document from which the contents within "<text-to-speech>" tags are deleted may be transmitted to the multimodal document reception processing apparatus 101.

Note that the present invention includes a case wherein the invention is achieved by directly or remotely supplying a program of software that implements the functions of the aforementioned embodiments (a program corresponding to the flow charts shown in the respective drawings in the embodiments) to a system or apparatus, and reading out and executing the supplied program code by a computer of that system or apparatus. In this case, software need not have the form of program as long as it has the program function.

Therefore, the program code itself installed in a computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy disk, hard disk, optical disk, magnetooptical disk, MO, CD-ROM, CD-R, CD-RW, magnetic tape, nonvolatile memory card, ROM, DVD (DVD-ROM, DVD-R)), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

The present invention is not limited to the above embodiments and various changes and modifications can be made within the spirit and scope of the present invention. Therefore, to apprise the public of the scope of the present invention, the following claims are made.

What is claimed is:

1. A multimodal document reception apparatus for receiving a multimodal document, which contains at least a description of an output style of text data, from a multimodal document transmission apparatus via a network, comprising:

speech input means for inputting speech data;

setting means for setting user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size;

transmission means for transmitting modality information indicating various functions of said multimodal document reception apparatus, the user setup information, and input speech data input by said speech input means to the multimodal document transmission apparatus;

reception means for receiving a multimodal document which is generated by the multimodal document transmission apparatus on the basis of the modality information, the user setup information and the input speech data, and for receiving output speech data corresponding to text data to be output as speech in the multimodal document;

speech output means for outputting output speech data received by said receiving means; and display control means for controlling displaying text data to be displayed in the multimodal document.

2. The apparatus according to claim 1, further comprising encoding means for generating encoded input speech data by encoding the speech input by said speech input means, wherein said transmission means transmits the encoded input speech data as the input speech data input by said speech input means to the multimodal document transmission apparatus.

3. The apparatus according to claim 1, wherein said reception means receives encoded output speech data as the output speech data corresponding to text data to be output as speech in the multimodal document,
and the apparatus further comprises decoding means for decoding the encoded output speech data,
wherein said speech output means outputs output speech data decoded by said decoding means.

4. The apparatus according to claim 1, wherein when said setting means generates modified user setup information obtained by modifying the user setup information, said transmission means transmits the modified user setup information to the multimodal document transmission apparatus.

5. The apparatus according to claim 1, wherein said reception means also receives a speech recognition result corresponding to the input speech data from the multimodal document transmission apparatus.

6. A multimodal document transmission apparatus for generating a multimodal document, which contains at least a description of an output style of text data, and transmitting the multimodal document to a multimodal document reception apparatus via a network, comprising:
reception means for receiving modality information indicating various functions of the multimodal document reception apparatus, user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size, and input speech data;
speech recognition means for performing speech recognition of the input speech data;
generation means for generating the multimodal document on the basis of a speech recognition result of said speech recognition means, the modality information, and the user setup information;
speech synthesis means for generating output speech data by synthesizing speech of text data to be output as speech in the multimodal document; and
transmission means for transmitting the multimodal document and the output speech data to the multimodal document reception apparatus.

7. The apparatus according to claim 6, wherein said reception means receives encoded input speech data as the input speech data.

8. The apparatus according to claim 6, wherein said speech synthesis means generates encoded output speech data as the output speech data,
and said transmission means transmits the encoded output speech data as the output speech data.

9. The apparatus according to claim 6, further comprising determination means for determining an edit file used to edit an original document required by the multimodal document reception apparatus on the basis of the modality information, and
wherein said generation means generates the multimodal document by editing the original document using the edit file determined by said determination means.

10. The apparatus according to claim 6, wherein when said reception means receives modified user setup information obtained by modifying the user setup information, said generation means edits the multimodal document, which is generated immediately before reception of the modified user setup information, on the basis of the modified user setup information.

11. The apparatus according to claim 6, wherein said transmission means also transmits the speech recognition result to the multimodal document reception apparatus.

12. A multimodal document transmission/reception system which is formed by connecting a multimodal document transmission apparatus for generating a multimodal document, which contains at least a description of an output style of text data, and a multimodal document reception apparatus for receiving a multimodal document via a network,
said multimodal document reception apparatus comprising:
speech input means for inputting speech data;
setting means for setting user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size;
first transmission means for transmitting modality information indicating various functions of said multimodal document reception apparatus, the user setup information, and input speech data input by said speech input means to said multimodal document transmission apparatus;
first reception means for receiving a multimodal document which is generated by said multimodal document transmission apparatus on the basis of the modality information, the user setup information and the input speech data, and for receiving output speech data corresponding to text data to be output as speech in the multimodal document;
speech output means for outputting output speech data received by said reception means; and
display control means for controlling displaying text data to be displayed in the multimodal document, and
said multimodal document transmission apparatus comprising:
second reception means for receiving the modality information, the user setup information, and the input speech data from said multimodal document reception apparatus;
speech recognition means for performing speech recognition of the input speech data;
generation means for generating the multimodal document on the basis of a speech recognition result of said speech recognition means, the modality information, and the user setup information;
speech synthesis means for generating output speech data by synthesizing speech of text data to be output as speech in the multimodal document; and
second transmission means for transmitting the multimodal document and the output speech data to said multimodal document reception apparatus.

13. A method of controlling a multimodal document reception apparatus for receiving a multimodal document, which contains at least a description of an output style of text data, from a multimodal document transmission apparatus via a network, comprising:

a speech reception step of receiving speech data;

a setting step of setting user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size;

a transmission step of transmitting modality information indicating various functions of the multimodal document reception apparatus, the user setup information, and input speech data received in said speech reception step to the multimodal document transmission apparatus;

a reception step of receiving a multimodal document which is generated by the multimodal document transmission apparatus on the basis of the modality information, the user setup information and the input speech data, and of receiving output speech data corresponding to text data to be output as speech in that multimodal document;

a speech output step of outputting output speech received in the reception step; and a display control step of controlling to display text data to be displayed in the multimodal document.

14. A method of controlling a multimodal document transmission apparatus for generating a multimodal document, which contains at least a description of an output style of text data, and transmitting the multimodal document to a multimodal document reception apparatus via a network, comprising:

a reception step of receiving modality information indicating various functions of the multimodal document reception apparatus, user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size, and input speech data;

a speech recognition step of performing speech recognition of the input speech data;

a generation step of generating the multimodal document on the basis of a speech recognition result of the speech recognition step, the modality information, and the user setup information;

a speech synthesis step of generating output speech data by synthesizing speech of text data to be output as speech in the multimodal document; and a transmission step of transmitting the multimodal document and the output speech data to the multimodal document reception apparatus.

15. A method of controlling a multimodal document transmission/reception system which is formed by connecting a multimodal document transmission apparatus for generating a multimodal document, which contains at least a description of an output style of text data, and a multimodal document reception apparatus for receiving a multimodal document via a network, the multimodal document reception apparatus performing the steps of:

a speech reception step of receiving speech data;

a setting step of setting user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size;

a first transmission step of transmitting modality information indicating various functions of the multimodal document reception apparatus, the user setup information, and input speech data received in said speech reception step to the multimodal document transmission apparatus;

a first reception step of receiving a multimodal document which is generated by the multimodal document transmission apparatus on the basis of the modality information, the user setup information and the input speech data, and of receiving output speech data corresponding to text data to be output as speech in that multimodal document;

a speech output step of outputting output speech received in said first reception step; and a display control step of controlling to display text data to be displayed in the multimodal document, and the multimodal document transmission apparatus performing the steps of:

a second reception step of receiving the modality information, the user setup information, and the input speech data from the multimodal document reception apparatus;

a speech recognition step of making speech recognition of the input speech data;

a generation step of generating the multimodal document on the basis of a speech recognition result of the speech recognition step, the modality information, and the user setup information;

a speech synthesis step of generating output speech data by synthesizing speech of text data to be output as speech in the multimodal document; and a second transmission step of transmitting the multimodal document and the output speech data to the multimodal document reception apparatus.

16. A computer-readable medium storing a program for making a computer control a multimodal document reception apparatus for receiving a multimodal document, which contains at least a description of an output style of text data, from a multimodal document transmission apparatus via a network, the program comprising:

a program code of a speech reception step of receiving speech data;

a program code of a setting step of setting user setup information containing a description indicating usage of each output function of said multimodal document reception apparatus, which defines that text in a multimodal document is displayed if a designated display font size of the text is larger than a predetermined size, or the text in the multimodal document is output as speech if a designated display font size of the text is less than the predetermined size;

a program code of a transmission step of transmitting modality information indicating various functions of the multimodal document reception apparatus, the user setup information, and input speech data received in said speech reception step to the multimodal document transmission apparatus;

a program code of a reception step of receiving a multimodal document which is generated by the multimodal document transmission apparatus on the basis of the modality information, the user setup information and the input speech data, and of receiving output speech data corresponding to text data to be output as speech in that multimodal document;

a program code of a speech output step of outputting output speech received in said reception step; and a program code of a display control step of controlling to display text data to be displayed in the multimodal document.

17. A computer-readable medium storing a program for making a computer control a multimodal document transmission apparatus for generating a multimodal document, which contains at least a description of an output style of text data, and transmitting the multimodal document to a multimodal document reception apparatus via a network, comprising:

a program code of a reception step of receiving modality information indicating various functions of the multimodal document reception apparatus, user setup information containing a description indicating usage of each output function of said multimodal document reception apparatus which defines that text in a multimodal document is displayed if a designated display font size of the text is larger than a predetermined size, or the text in the multimodal document is output as speech if a designated display font size of the text is less than the predetermined size, and input speech data;

a program code of a speech recognition step of performing speech recognition of the input speech data;

a program code of a generation step of generating the multimodal document on the basis of a speech recognition result of the speech recognition step, the modality information, and the user setup information;

a program code of a speech synthesis step of generating output speech data by synthesizing speech of text data to be output as speech in the multimodal document; and a program code of a transmission step of transmitting the multimodal document and the output speech data to the multimodal document reception apparatus.

* * * * *

UNITED STATES PATENT AND TRADEMARK OFFICE
CERTIFICATE OF CORRECTION

| | | |
|---|---|---|
| PATENT NO. | : 7,174,509 B2 | Page 1 of 2 |
| APPLICATION NO. | : 10/291722 | |
| DATED | : February 6, 2007 | |
| INVENTOR(S) | : Sakai et al. | |

It is certified that error appears in the above-identified patent and that said Letters Patent is hereby corrected as shown below:

TITLE SHEET:
Item (57) Abstract, Line 6, "is" should be deleted; and
Line 9, "GUT" should read -- GUI --.

SHEET 17:
FIG. 17, "PERSONSWHO" should read -- PERSONS WHO --.

COLUMN 2:
Line 62, "comprising;" should read -- comprising: --.

COLUMN 3:
Line 44, "GUT" should read -- GUI --;
Line 50, "GUT" should read -- GUI --; and
Line 54, "GUT" should read -- GUI --.

COLUMN 8:
Line 32, "GUT" should read -- GUI --.

COLUMN 11:
Line 40, "include" should read -- includes --.

COLUMN 14:
Line 65, "GUT." should read -- GUI. --.

COLUMN 15:
Line 54, "along" should read -- long --.

UNITED STATES PATENT AND TRADEMARK OFFICE
CERTIFICATE OF CORRECTION

PATENT NO. : 7,174,509 B2
APPLICATION NO. : 10/291722
DATED : February 6, 2007
INVENTOR(S) : Sakai et al.

It is certified that error appears in the above-identified patent and that said Letters Patent is hereby corrected as shown below:

COLUMN 22 CLAIM 17:
Line 3, "apparatus" should read -- apparatus, --.

Signed and Sealed this

Twenty-fifth Day of March, 2008

JON W. DUDAS
*Director of the United States Patent and Trademark Office*